US006771746B2

United States Patent
Shambaugh et al.

(10) Patent No.: US 6,771,746 B2
(45) Date of Patent: Aug. 3, 2004

(54) METHOD AND APPARATUS FOR AGENT OPTIMIZATION USING SPEECH SYNTHESIS AND RECOGNITION

(75) Inventors: Craig Shambaugh, Wheaton, IL (US); James L. Beck, III, Orland Park, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 0 days.

(21) Appl. No.: 10/150,890

(22) Filed: May 16, 2002

(65) Prior Publication Data

US 2003/0215066 A1 Nov. 20, 2003

(51) Int. Cl.[7] .............................. H04M 1/64; H04M 3/00
(52) U.S. Cl. ................. 379/88.13; 379/88.17; 379/88.18; 379/265.01; 379/265.07; 379/265.09; 379/266.01; 379/266.07
(58) Field of Search ...................... 379/88.01, 88.02, 379/88.03, 88.04, 88.13, 265.01, 265.02, 265.07, 265.09, 266.01, 266.07, 88.17, 88.18

(56) References Cited

U.S. PATENT DOCUMENTS

| | | | | |
|---|---|---|---|---|
| 5,325,421 A | * | 6/1994 | Hou et al. | 379/67 |
| 5,615,296 A | * | 3/1997 | Stanford et al. | 395/2.1 |
| 5,652,789 A | * | 7/1997 | Miner et al. | 379/201 |
| 5,757,904 A | * | 5/1998 | Anderson | 379/265 |
| 5,946,386 A | * | 8/1999 | Rogers et al. | 379/265 |
| 6,108,610 A | * | 8/2000 | Winn | 702/77 |
| 6,330,079 B1 | * | 12/2001 | Dugan et al. | 358/403 |
| 6,434,230 B1 | * | 8/2002 | Gabriel | 379/265.01 |
| 6,526,395 B1 | * | 2/2003 | Morris | 706/20 |

* cited by examiner

*Primary Examiner*—Allan Hoosain
(74) *Attorney, Agent, or Firm*—Welsh & Katz, Ltd.

(57) ABSTRACT

A system and method of automatic call handling allowing agent optimization in an automatic call distributor using voice recognition and speech synthesis technology. A speech synthesizer takes a script as input and generates speech as output. A prepared script includes speech input for the speech synthesizer. Connect a call with a call contact, speak to the call contact speech generated using the prepared script as input to the speech synthesizer, receive live agent voice input, and recognize agent speech.

16 Claims, 6 Drawing Sheets

METHOD AND APPARATUS FOR AGENT OPTIMIZATION USING SPEECH SYNTHESIS AND RECOGNITION

This application relates generally to artificial intelligence using voice recognition and speech synthesis. More specifically, this application relates to a method and apparatus for automatic agents in an automatic call center using speech recognition and speech synthesis technology.

BACKGROUND

Call centers provide important solutions to customer contact problems in electronic commerce. An example of such a system is the Spectrum® Integrated Call Center System available from Rockwell Electronic Commerce, global provider of proven customer contact solutions for voice and Internet media. The Automatic Call Distributor (ACD) is a focal point of a customer contact center. The "calls" handled by an ACD can be any customer contact including but not limited to telephone calls, wireless calls, facsimile, e-mails, internet chat, and other internet like contacts. Thus, an ACD can accept customer voice and data contacts and distribute each to a properly skilled agent representative, and can be implemented on any structure using hardware, software or a combination of both in for example, an integrated system, a distributed system using multiple computers, or a software driven solution using a personal computer.

Call center administrators can set up a call flow or call flows for an ACD platform. Tools for managing call flows include scripts for routing calls. Such scripts can be programmed over a general-purpose computer included in an ACD platform.

Call routing allows a call center to accept each customer contact and distribute it to the proper agent representative. It is known to route calls using an icon-based Windows application tool. Using such a tool, a user can create a series of steps to route a customer contact efficiently to a desired agent. Scripts are used to direct calls to Agent Groups, Intelligent Announcements, ACD Mail, VRU ports and other call centers. Scripts can provide the call center with direct control call-by-call over interactions with the telephone network.

Existing technology requires that an individual agent handle each separate call. Under this existing technology, an individual agent must handle each call even if the call contact asks the same question and should receive the same responses as many other callers.

Known systems for handling calls in an automated call center require an extensive staff of agents, because an individual agent must participate in each call. Such individual call handling can be less than optimally efficient if a number of different call contacts tend to pose the same questions and should receive the same responses from agents. In addition to inefficiency, the quality of individual call handling can be affected by individual agent fatigue or by inadvertent errors or omissions by individual agents.

Current technology only allows for one agent per call. This requires an agent to handle each call even if the same questions or responses are given to or from one call contact as another call contact. If the agent is consistently responding to many callers in the same way it would be desirable to automate the process and only require an agent to be involved when something unexpected or unique happens during the call.

SUMMARY

The invention, together with the advantages thereof, may be understood by reference to the following description in conjunction with the accompanying figures, which illustrate some embodiments of the invention.

One mode of practicing the invention is a method of automatic call handling allowing agent optimization in an automatic call distribution system that comprises synthesizing speech by using a script as input and generating speech as output, connecting a call from or to a call contact, and speaking to the call contact using speech generated using the prepared script as input. The method further comprises identifying any need to use a live agent to respond to call contact, making an extemporaneous script using an agent speech recognizer to recognize live agent voice input and generating speech for transmission to the call contact. The agent speech recognizer can, in various embodiments, perform speech-to-text conversion, speaker dependent recognition, continuous-speech recognition, contiguous-word recognition, and isolated-words recognition. The speech synthesizer can also include additional steps to record different pronunciations from a professional voice, save the different pronunciations recorded from a professional voice, and use the different pronunciations recorded from a professional voice to synthesize speech.

A second mode of practicing the invention is an agent assist method of automatic call handling in an automatic call distribution that includes the steps of synthesizing speech by using a proposed script as input and generating as output speech that sounds like a live agent's natural voice, connecting a call with a call contact, and transmitting synthesized speech generated using the prepared script as input to the call contact. The method further comprises receiving call contact voice input, transmitting the call contact voice input to the live agent, and accepting direction from the live agent indicating a response to the call contact's voice input. Responses to the call contact's voice input can in some embodiments include providing a second prepared script and connecting the call to the live agent for the live agent to converse with the call contact. One embodiment of this mode may include steps to monitor background noise surrounding the live agent and then introduce background noise into the synthesized speech to mimic the live agent's environment.

Other modes of practicing the invention include a system with an automatic call distributor that has means to perform the steps of the method summarized above. Yet another mode of practicing the invention is a computer program product embedded in a tangible medium of expression that includes computer program code to perform the steps summarized above.

REFERENCE TO THE DRAWINGS

Several aspects of the present invention are further described in connection with the accompanying drawings in which.

DETAILED DESCRIPTION

Figure 1:
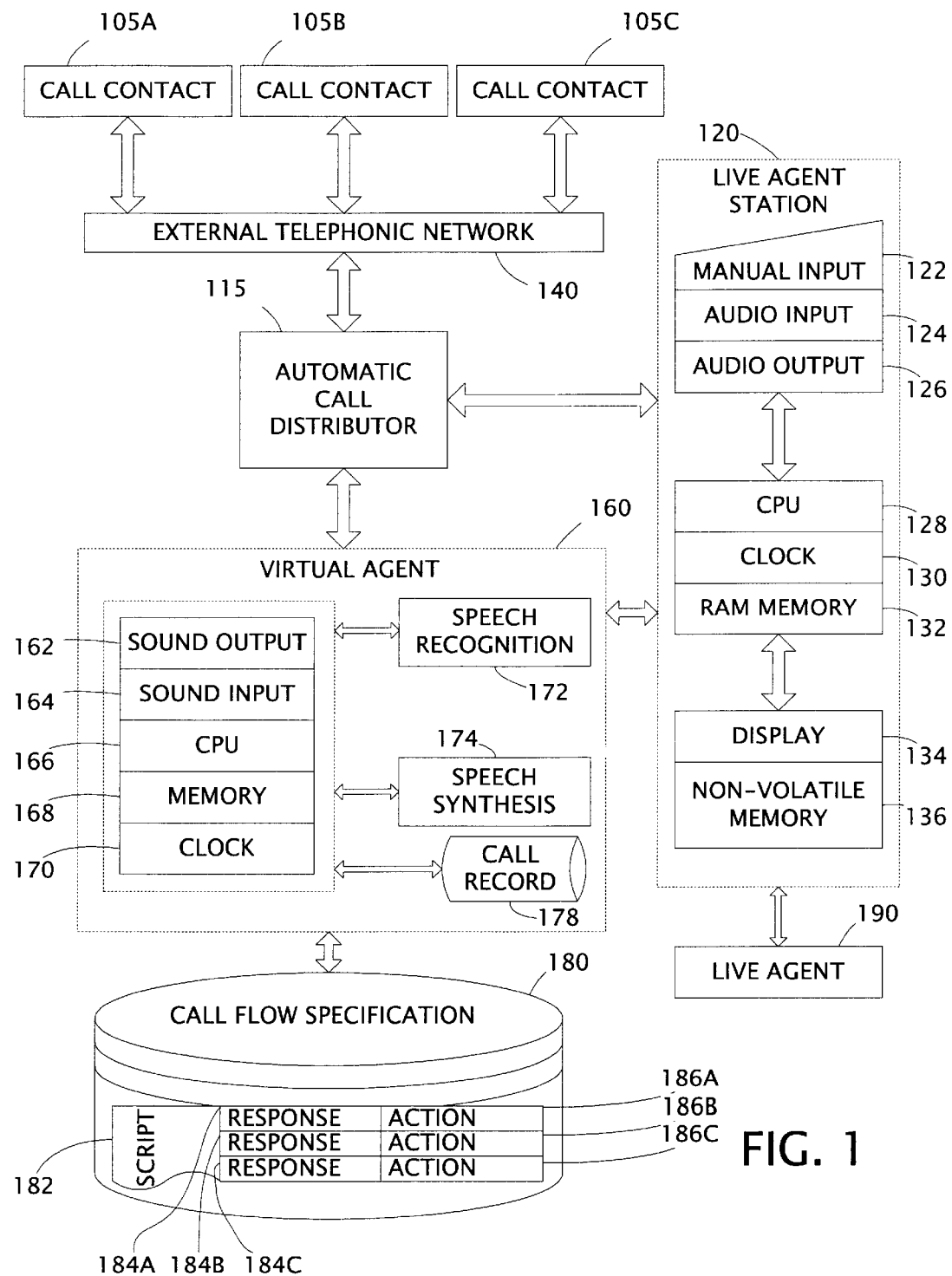
FIG. 1 is a block diagram illustrating one embodiment of a system including an automatic call distributor for agent optimization using speech synthesis and recognition.

While the present invention is susceptible of embodiment in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

Several types of embodiments of the invention are described herein, including a first mode which provides for handling calls automatically, and a second mode which provides for assisting an agent and helping to optimize the agent's time. These modes use speech recognition and speech synthesis technology. Particular embodiments may use text-to-speech synthesis and speech-to-text conversion.

In one embodiment, a call center creates one or a group of "virtual agents." Different pronunciations from a professional voice can be recorded and saved to be used when piecing together different scripts to create sounds as if a human voice is speaking. Speech recognition and speech synthesis, or in one embodiment speech-to-text conversion and text-to-speech conversion, can be used to allow the live agent to sound like the "virtual agent."

When an agent replies to a call contact using the agent's own voice the call contact may detect that the call contact has been previously talking to a machine, which some call contacts may dislike. It may therefore be desirable to mask the voice of the agent so that the agent's voice matches the voice of the "virtual agent." The virtual agent can mask the live agent's voice by having what the agent says translated to text by speech recognition such as, in one embodiment, speech-to-text conversion. The text produced can then be spoken to the caller by using the same speech synthesis technology, which in one embodiment can be text-to-speech technology, used when the original script was spoken. In this way agents can sound like any of the "virtual agents" created by the call center and a particular live agent is no longer tied to a call.

In another embodiment, the agent's speech can be translated, not into natural language text, but instead into some phonetic or other intermediate representation of the agent's speech. This representation can then be supplied as input for speech synthesis. This embodiment may have the advantage of not requiring as sophisticated a speech recognition technology as would be required to produce textual output. Any other speech transformation technique which connects to the speech of the agent so that it sounds like that of the virtual agent can also be used.

In some embodiments, a call center administrator can set up a call flow including different scripts that can be spoken/read to the call contact via text-to-speech conversion and a list of valid responses with which the call contact is expected to respond. When the call contact responds to a script his/her response can be evaluated using speech recognition technology, which allows the computer to decide on an appropriate action. In one embodiment of this mode of practicing the invention, the action can be to save the call contact's response and to speak another appropriate script to the call contact in order to gather further information. In this way a call may be handled and routed through different text scripts without human interaction.

In some embodiments this automatic routing works only for the known set of responses programmed by the call center administrator. A connection to a live agent may be needed if the call contact gives an unexpected response to one of the scripts. When a call contact gives an unexpected response, that response can be saved, in one embodiment, allowing the information to be displayed to the agent when the agent receives the call. The information can also be displayed so that the call center administrator will be able to evaluate it to determine if it is appropriate to add this response and a reference to a new or existing script to the call flow specification. This evaluation can be done at any time, whether during the call of after the call is terminated.

The computer in one embodiment can respond to the call contact, indicating that the call contact's response was not understood, while it routes the call to a live agent to be handled correctly. For example: the computer can be programmed to respond, "Sorry I did not completely hear what you said, could you please repeat it again?" This response can allow time for the call to be routed to an agent. The call contact can then repeat the unknown response with the live agent listening to the call. When the call is routed to the agent in this embodiment, the script text that the computer was speaking when the unexpected response was given can also be sent to the agent. The text already spoken can be highlighted so that the agent will know what has been spoken to the call contact. In one embodiment, textual representations of valid responses that the call contact has given to earlier scripts can also be provided so that the agent can review what has transpired in the call. A bar can also be displayed to the agent, representing where the call is in the call flow. This information can give the agent a rough idea of what is being discussed with the call contact if the agent is familiar with the call flow being spoken. This bar can also be used in some embodiments to send the call contact back to an appropriate place within the call flow when the live agent is finished. This returning can be done, for example, by pointing with the mouse to the section of the call flow to continue the call and then clicking, thereby sending the caller back to the appropriate text to speech section and freeing up the agent to speak to another live person.

The table below recites an example of a dialog using one embodiment.

An outbound call has been completed to a live person.
Text-to-speech: Hello, may I please speak with Mr. Doe?
Call Contact: Please wait while I get him.
Call Contact: Hello, this is Mr. Doe.
Text-to-speech: Hello Mr. Doe this is Jon with Alexander Bell.
How are you doing today?
Call Contact: Fine.
Text-to-speech: Good. I am calling you today to talk to you about our new local service offer.
More text/speech explaining local service is given . . . .
To switch you to this new plan all I need is your permission.
Call Contact: Don't you offer long distance service also, and how can I bundle local and long distance together?
Unexpected Response—forward the call to an agent.
Text-to-Speech: I'm sorry I did not completely hear your question, could you please say it again?
Call Contact: Don't you offer Long distance service also, and how can I bundle local and long distance together?
Agent: Sorry, we don't offer long distance yet.
Completes response and then sends the live person back to the computer.
Text-to-Speech: Thank you. Alexander Bell appreciates your business.

In another embodiment much of the same technology is used. This embodiment allows the agent to record different pronunciations of different sounds and save them to be used by a speech synthesis system and/or a text-to-speech conversion program when piecing together different scripts to create sounds as if a human voice is speaking. Thus, it sounds as if an individual agent is speaking instead of the "virtual agent" as discussed above.

When an agent accepts a call connection, an appropriate script can be spoken/read to the call contact in the agent's own voice by the speech synthesis system. At this point the agent can listen to and can hear the presentation to the call contact and all responses given. The agent in one embodiment can have the ability to choose and direct which script is spoken to the other party, or the ability to break into the conversation and take over the handling of the call when needed. Since the agent in such an embodiment only needs to be a passive participant on the call, the agent may be able to perform other functions while handling the call unless and until the live agent needs to speak to the call contact for some reason. For example: the agent may be able to monitor the call and perform other work because the call does not require the agent's full attention.

Allowing the agent to be a silent participant in the conversation may in some embodiments have advantages because the agent knows what is happening on the call if the agent needs to intervene. The agent already knows information about the call instead of attempting to learn about it immediately after the call is delivered or rerouted.

In one embodiment, this mode can also monitor the background noise surrounding the live agent. This measurement allows similar noise to be introduced into the call at a similar level when the synthesized speech (or, in one embodiment, text-to-speech) is being spoken to the call contact. Background noise can be prerecorded, or the actual ambient sound around the agent can be used. This introduction of background noise can reduce any perception of being "handed off" to a live agent when the live agent takes over.

Referring now to FIG. 1, there is disclosed a block diagram of one embodiment of a system including an automatic call distributor for using speech recognition and synthesis in call handling or to assist agents. An automatic call distributor (115) can connect calls through an external telephonic network (140) to call contacts (105A, 105B, 105C). The automatic call distributor (115) is connected to a live agent station (120), including manual input (122) such as a keyboard, audio input (124) such as a microphone, and audio output (126) such as headphones. The live agent station (120) in the embodiment depicted can also include a CPU (128), clock (130), RAM memory (132), a display (134) such as a CRT, and non-volatile memory (136) such as a hard disk. A live agent (190) operates the live agent station (120).

Referring still to the embodiment of FIG. 1, the automatic call distributor (115) is also connected to a virtual agent (160). The depicted embodiment of a virtual agent (160) includes sound output (162), sound input (164), a CPU (166), a memory (168) and a clock (170). The depicted embodiment of a virtual agent (160) also includes modules for speech recognition (172), such as speech-to-text conversion, and for speech synthesis (174), such as text-to-speech conversion. An alternative embodiment (not pictured) may include a second module for speech recognition, e.g., speaker independent speech recognition. The depicted embodiment of a virtual agent (160) can also include storage for a call record (178). The depicted embodiment of a virtual agent (160) includes or is connected to a call flow specification database (180) including one or more scripts (182) having associated responses (184A, 184B 184C) and actions (186A, 186B, 186C) associated with those responses. The virtual agent (160) can be operably connected to the live agent station both directly and also through the automatic call distributor (115).

In one embodiment of an automatic call distributor (115), calls can be placed automatically by the automatic call distributor system itself. If there is no answer, the number is not in service, or the call otherwise fails to connect then the automatic call distributor can proceed to the next number without connecting the call to an agent. If the call is connected, the call can then be assigned to a human agent or to a virtual agent as described in the various modes of practicing different embodiments of the present invention set forth above.

Alternatively, calls placed from outside persons depicted here as call contacts (105A, 105B, 105C) can be received by the automatic call distributor. When a human agent or a virtual agent becomes available, this incoming call can be assigned to that available human agent or virtual agent.

Figure 2:
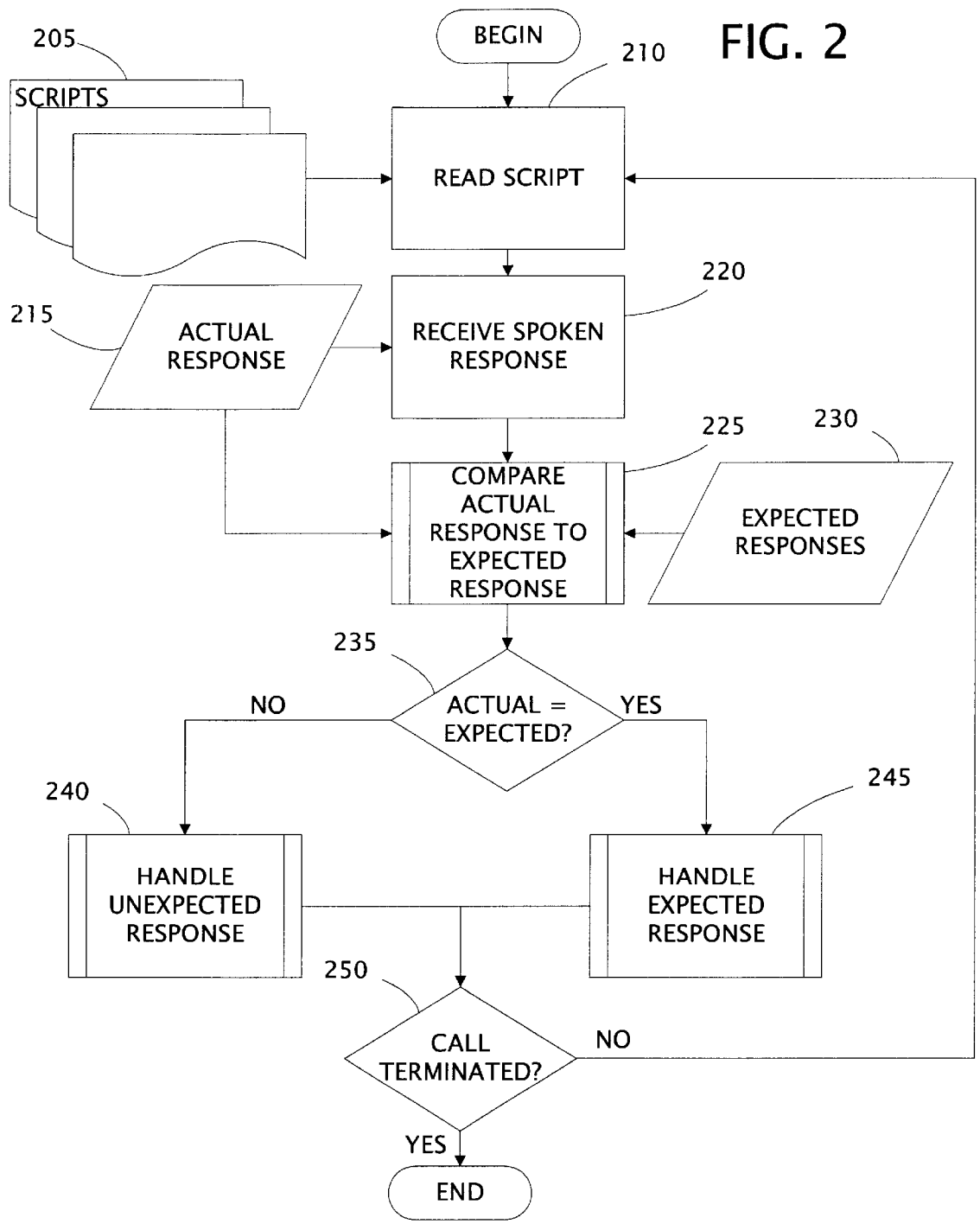
FIG. 2 is a flowchart illustrating the flow of data and control of processes in an embodiment of a method of agent optimization using speech synthesis and recognition.

Referring now to FIG. 2, there is illustrated a system flow chart depicting the control of operations and the data flow in an embodiment of a system for agent optimization using voice recognition and text to speech. Script data (205) is provided for the system to use. Control of the system passes first to a read script process (210), which generates voice output using the script data (205) provided. Control passes next to a receive spoken response process (220) that records the actual response (215) of a call contact after the script has been read. Expected responses data (230) is also provided. After the receive spoken response process (220) receives the actual response (215) from the call contact, control passes next to a compare actual response to expected response process (225). The system then determines whether the actual response (215) was an expected response (230). In the affirmative, if the actual response (215) was an expected response (230), control passes next to a handle expected response process (245). The handle expected response process (245) can record data, determine a follow-up script to read, write information offline, or perform other functions. In the negative if the actual response (215) was not an expected response (230), control passes to a handle unexpected response process (240). The handle unexpected response process (240) can transfer control to a live agent, write information offline, or perform other functions. After the response has been processed, the system will determine whether the call has been terminated (250). If the call has been terminated, the algorithm ends, and can be re-invoked when another call is placed. If the call has not been terminated, control passes back to the read script process (210) which will read another provided script (205).

Figure 3:
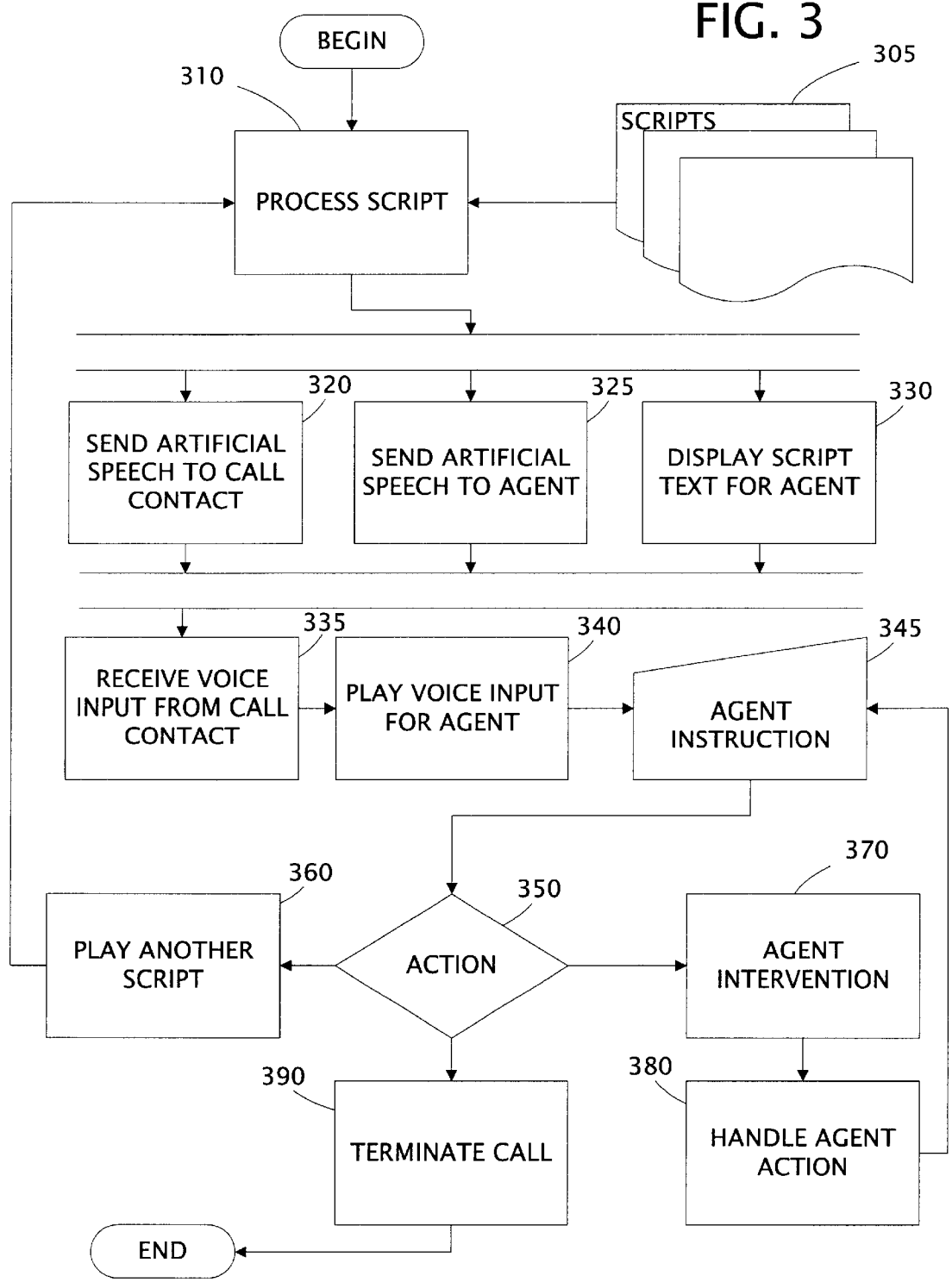
FIG. 3 is a flowchart illustrating the flow of data and control of processes in another embodiment of a method of agent optimization using speech synthesis and recognition.

Referring now to FIG. 3, there is depicted a system flowchart of another embodiment of a method for agent optimization using speech recognition and text to speech. A set of scripts (305) are provided. The system first calls a process script process (310), which generates artificial speech then calls a send artificial speech to call contact process (320), a send artificial speech to agent process (325), and a display script text for agent process (330). After performing these processes, control passes next to a receive voice input from call contact process (335), which accepts voice input from the call contact with whom the telephone call was connected. Control passes next to a play voice input for agent process (340). In one mode of practicing this embodiment, voice input can be played for the agent at the same time it is received from the call contact. Control passes next to an agent instruction process (345) in which the system accepts instruction from the agent about the next action to be performed in response to the voice input. The agent instruction process (345) can take input from the agent in the form of, for example, keyboard entry or voice data input. Control passes next to an action branch process (350), which performs an action based on the agent instruction (345). As one example of such an action, the system can pass control to a play another script process (360) which passes control back to the process script process (310). As a second example of such an action, control can pass to an agent intervention process (370), which can permit the agent to interact directly with the call contact. After the agent intervention process (370) control passes next to a handle agent action process (380). Control can then pass back to the agent instruction process (345). As a third example of an action that can be performed in response to agent instruction, the system can invoke a terminate call process (390), which will terminate the call and hang up the telephone.

Figure 4:
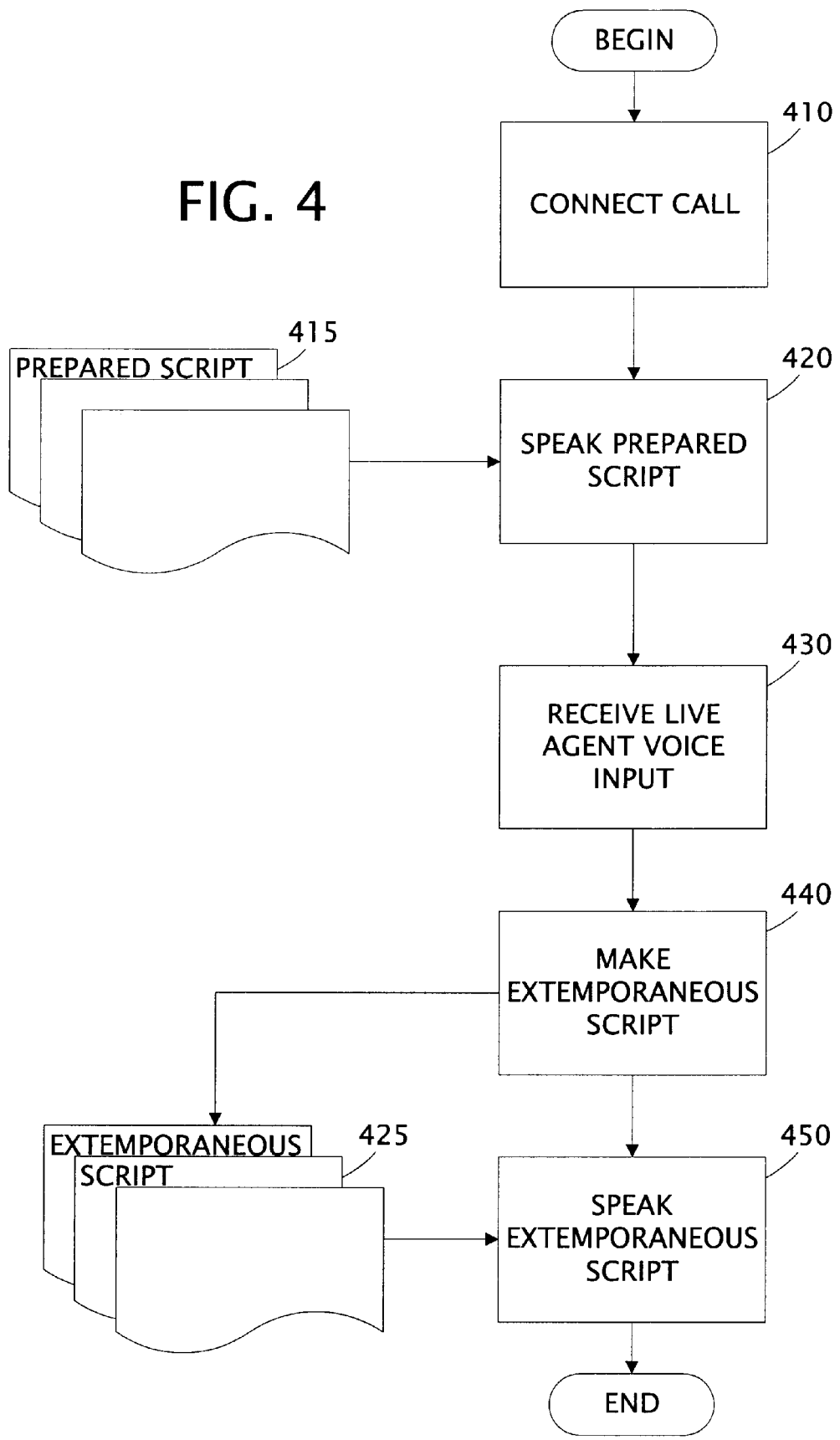
FIG. 4 is a flowchart illustrating the flow of data and control of processes in an embodiment of a method of agent optimization using speech synthesis and recognition.

Referring now to FIG. 4, there is depicted another embodiment of a method for agent optimization using speech recognition and text to speech. The method first invokes a connect call process (410), which will connect the call from, for example, an automatic call distributor to a call contact. Control passes next to a speak prepared script process (420), which takes input from prepared script data (415) and generates as output artificial speech which is transmitted over the telephone lines to the call contact. The system can next perform a process such as receiving voice input from the call contact (not pictured). Control passes then to a receive live agent voice input process (430), in which the live agent speaks into an apparatus (such as, for example, a microphone) a reply appropriate to the response of the call contact to the prepared script. Upon receiving live agent voice input, control passes to a make extemporaneous script process (440) in which the live agent voice input is converted to synthesized speech to preserve the call continuity and avoid the perception that a different person is speaking. The make extemporaneous script process (440) creates extemporaneous script data (425), which may be in the form of text or some other convenient form such as phonetic data. Control passes next to a speak extemporaneous script process (450), in which the extemporaneous script data (425) is spoken to the call contact.

Figure 5:
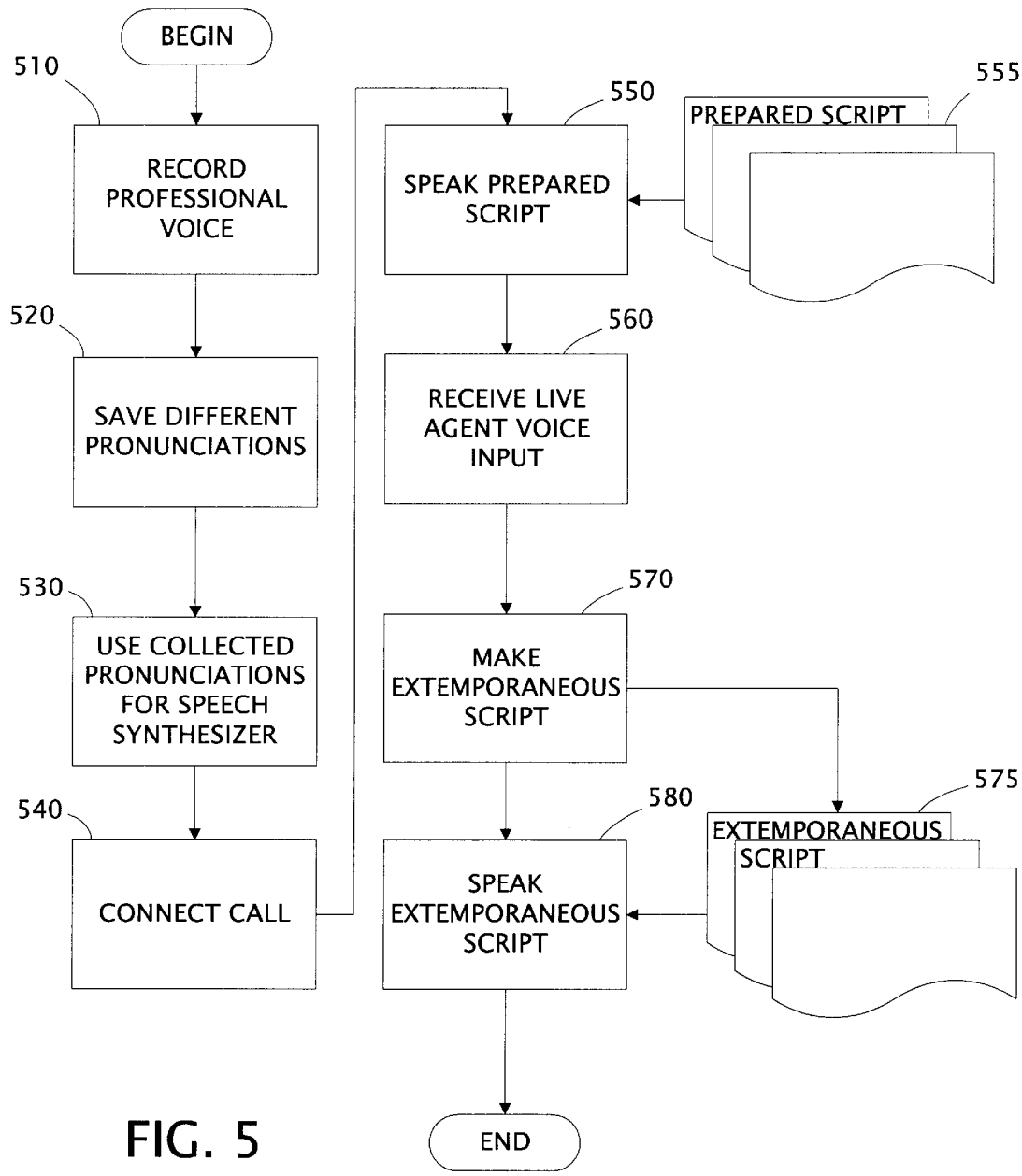
FIG. 5 is a flowchart further illustrating the flow of data and control of processes in an embodiment of a method of agent optimization using speech synthesis and recognition.

Referring now to FIG. 5, there is depicted another embodiment of a method and apparatus for agent optimization using voice recognition and text to speech. Within the illustrated embodiment, a record professional voice process (510) records samples of speech from a professional voice. A save different pronunciations process (520) then saves pronunciations from one or more professional voices. A use collected pronunciations for speech synthesizer process (530) then uses those saved pronunciations to generate an artificial voice in a speech synthesis module. Processes 510, 520, and 530 for preparing an artificial voice can be performed separately from the other processes depicted in FIG. 5. A connect call process (540) connects a call with a call contact using, for example, an automatic call distributor. After the call has been connected, a speak prepared script process (550) will use prepared script data (555) assembled by, for example, a supervisor, to communicate a selected message to a call contact. After the prepared script is spoken, the system can then perform other process, not pictured, such as receiving voice input from the call contact, which also can be monitored by a live agent. A receive live agent voice input process (560) accepts voice input from a live agent by, for example, a microphone. A make extemporaneous script process (570) then takes the live agent voice input and converts it to extemporaneous script data (575). Extemporaneous script data (575) can be in the form of text or some other data reflecting speech. A speak extemporaneous script process (580) then generates artificial speech using the extemporaneous script data (575).

Figure 6:
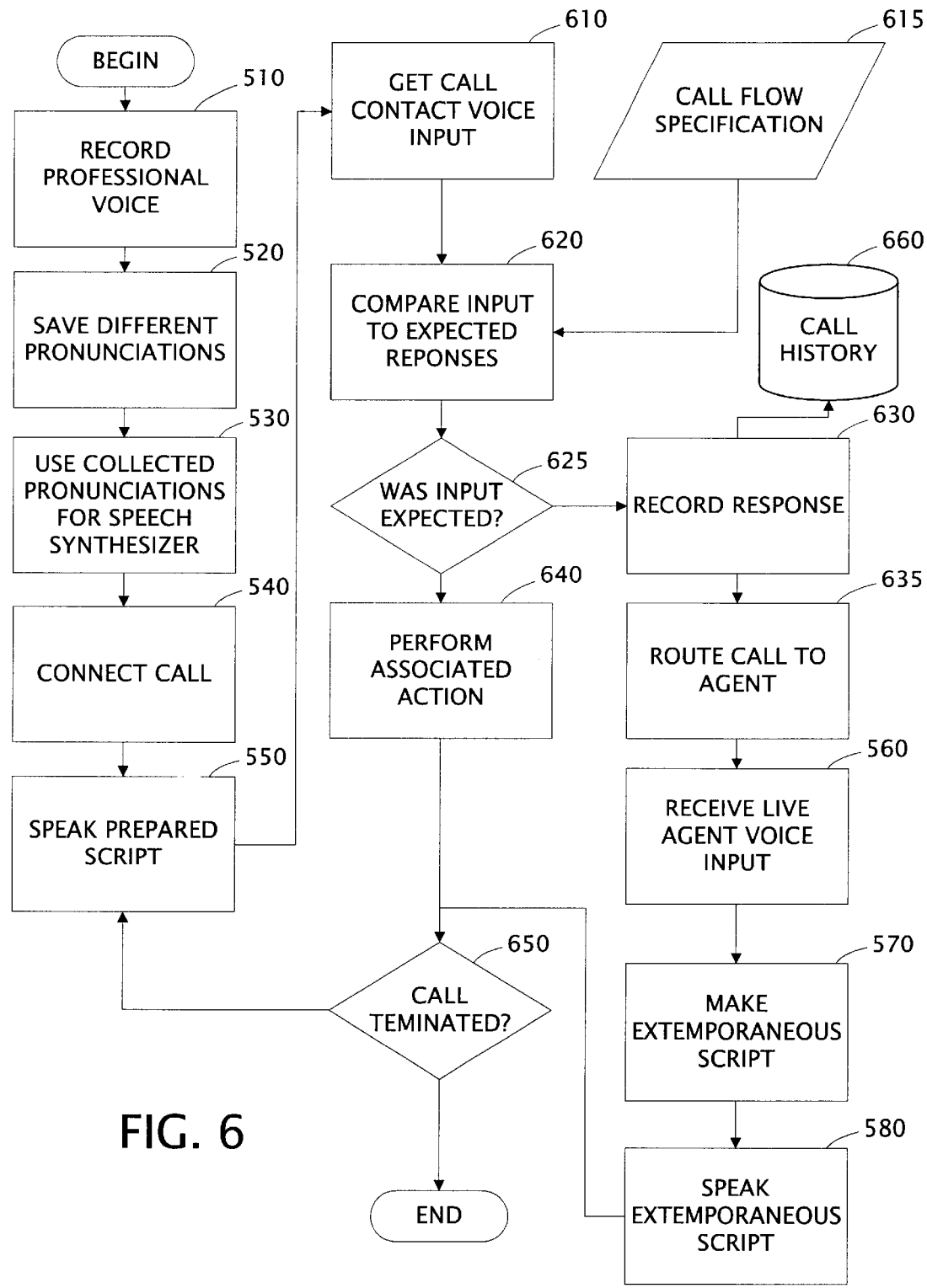
FIG. 6 is a flowchart illustrating the flow of data and control of processes in an embodiment of a method of agent optimization using speech synthesis and recognition.

Referring now to FIG. 6, additional detail illustrating another embodiment is shown. The processes that appeared in FIG. 5 contain the same reference numbers. After the speak prepared script process (550), control passes next to a get call contact voice input process (610). Control passes next to a compare input to expected response process (620), which makes its comparison based on call flow specification data (615) that can be provided, for example, during system set up. Control passes next to a was input-expected decision (625). If the input is an expected response, control passes next to a perform associated action process (640). In another embodiment not pictured, an expected response can also be written to call history data (660) for possible later use. After the perform associated action process (640), control passes next to a call termination decision (650). If the call is terminated, the process ends. If the call is not terminated, control passes back to the speak prepared script process (550), which reads a new script appropriate to the previous caller's response. If the was-input-expected decision (625) determines that the input was not expected, control passes to a record response process (630) which records the unexpected response to a call history. Unexpected responses in the call history can be used to update the call flow specification (615) with additional appropriate scripts. Control passes then to a route call to agent process (635), which connects the call to a live agent. The live agent provides a spoken reply to the unexpected response received from the call contact, control of which is handled by the receive live agent voice input process (560), the make extemporaneous script process (570) and the speak extemporaneous script process (580), all described above in connection with FIG. 5. After the extemporaneous script has been spoken using artificial speech, the agent can continue to communicate with the call contact using voice synthesization until such time as the call is terminated or until the agent is able to identify another appropriate script to be read.

An advantage of some embodiments may be to reduce agent staffing requirements. Depending on the complexity and sophistication of the call center's call flow, the number of agents needed to support a call center may be greatly reduced.

Another advantage of some embodiments may be to allow for a more consistent and accurate delivery of the presentation given to the call contact. The synthetic speech will never sound fatigued or skip important sections of the script being spoken to the call contact. Also, some embodiments can remove any distracting background noise from the call. When a script is being spoken to a call contact no background noise need be present and when an agent is having his/her voice filtered through speech-to-text and text to speech again to sound as if the "virtual agent" is talking all background noise can be removed.

Another advantage of some embodiments may be to allow a more careful tracking of what is said by the call contact. Since the "virtual agent's" voice is a known voice pattern that will always sound the same, it can be filtered out of any transcripts or recordings taken of the call. This will remove any confusion over what the live party has said in the transaction.

Another advantage of some embodiments including speech-to-text conversion or text-to-speech conversion may be to allow the call center administrator to change or enhance the script that is spoken to the caller. After the administrator changes the scripts the changes can take effect whenever the administrator chooses.

While the present invention has been described in the context of particular exemplary data structures, processes, and systems, those of ordinary skill in the art will appreciate that the processes of the present invention are capable of being distributed in the form of a functional unit, or software for an information processing system.

A functional unit is an entity of hardware or software, or both, capable of accomplishing a specified purpose. Hardware is all or part of the physical components of an information processing system. Software includes all or part the programs, procedures, rules, and associated documentation of an information processing system. An information processing system is one or more data processing systems and devices, such as office and communication equipment, that perform information processing. A data processing system includes one or more computers, peripheral equipment, and software that perform data processing.

A computer is a functional unit that can perform substantial computations, including numerous arithmetic operations and logic operations without human intervention. A computer can consist of a stand-alone unit or can comprise several interconnected units. In information processing, the term computer usually refers to a digital computer, which is a computer that is controlled by internally stored programs and that is capable of using common storage for all or part of a program and also for all or part of the data necessary for the execution of the programs; performing user-designated manipulation of digitally represented discrete data, including arithmetic operations and logic operations; and executing programs that modify themselves during their execution. A computer program is syntactic unit that conforms to the rules of a particular programming language and that is composed of declarations and statements or instructions needed to solve a certain function, task, or problem. A programming language is an artificial language (a language whose rules are explicitly established prior to its use) for expressing programs.

Software for an information processing system can be stored as instructions and the like on a computer readable medium in a variety of forms. The present invention applies equally regardless of the particular type of signal bearing computer readable media actually used to carry out the distribution. Computer readable media includes any recording medium in which computer code may be fixed, including but not limited to CD's, DVD's, semiconductor RAM, ROM, or flash memory, paper tape, punch cards, and any optical, magnetic, or semiconductor recording medium or the like. Examples of computer readable media include recordable-type media such as floppy disk, a hard disk drive, a RAM, and CD-ROMs, DVD-ROMs, an online internet web site, tape storage, and compact flash storage, and transmission-type media such as digital and analog communications links, and any other volatile or non-volatile mass storage system readable by the computer. The computer readable medium includes cooperating or interconnected computer readable media, which exist exclusively on single computer system or are distributed among multiple interconnected computer systems that may be local or remote. Many other configurations of these and similar components (which can also comprise computer system) are considered equivalent and are intended to be encompassed within the scope of the claims herein.

Although embodiments have been shown and described, it is to be understood that various modifications and substitutions, as well as rearrangements of parts and components, can be made by those skilled in the art, without departing from the scope of the invention defined in the appended claims. Therefore, the spirit and scope of the appended claims should not be limited to the description of the embodiments contained herein. Although the appended claims do not recite every detail described above in illustrated embodiments, the claims are intended to cover that subject matter also, in addition to the subset of that subject matter recited below as limitations. The entire subject matter is therefore claimed and not dedicated to the public. The appended claims are contemplated to cover the present invention and any and all modifications, variations, or equivalents that fall within the true spirit and scope of the basic underlying principles disclosed and claimed herein.

We claim:

1. A agent assist method of automatic call handling in an automatic call distribution system, the method comprising:

synthesizing speech using a prepared script as input and generating as output synthesized speech that sounds like a live agent's natural voice;

connecting a call with a call contact;

speaking the synthesized speech generated using the prepared script to the call contact;

receiving call contact voice input;

transmitting the call contact voice input to the live agent;

accepting direction from the live agent indicating a response to the call contact's voice input;

monitoring background noise surrounding the live agent; and the introducing background noise into the synthesized speech to emulate the live agent's environment.

2. The agent assist method of automatic call handling according to claim 1 wherein the response to the call contact's voice input comprises providing a second prepared script.

3. The agent assist method of automatic call handling according to claim 1 wherein the response to the call contact's voice input comprises connecting the call to the live agent for the live agent to converse with the call contact.

4. The agent assist method of automatic call handling according to claim 1 wherein the live agent is free to work on other tasks during the telephone call.

5. An agent assist system to assist a live agent with automatic call handling in an automatic call distribution system, the agent assist system comprising:

a speech synthesizer that uses a prepared script as input and generates as output synthesized speech that sounds like a live agent's natural voice;

a network that connects a call with a call contact;

a communications channel that transmits to the call contact the synthesized speech generated using the prepared script, that receives voice input from the call contact, and that communicates voice input from the call contact to the live agent;

a controller that accepts direction from the live agent indicating a response to the call contact's voice input;

a detector to monitor background noise surrounding the live agent;

the speech synthesizer introducing background noise into the synthesized speech to emulate the live agent's environment.

6. The agent assist system according to claim 5 wherein the controller enables the live agent to indicate a second prepared script for use in the call.

7. The agent assist system according to claim 5 wherein the controller enables the live agent to speak directly with the call contact.

8. The agent assist system according to claim 5 wherein the live agent is free to work on other tasks during the telephone call.

9. An agent assist system to assist a live agent with automatic call handling in an automatic call distributor, the system comprising:
- means for synthesizing speech that generates from a script output synthesized speech that sounds like a live agent's natural voice;
- means for connecting a call with a call contact;
- means for speaking to the call contact speech generated using a prepared script as input to the speech synthesizer;
- means for receiving call contact voice input;
- means for transmitting the call contact voice input to the live agent;
- means for accepting direction from the live agent indicating a response to the call contact's voice input;
- means for monitoring background noise surrounding the live agent; and
- the speech synthesizer introducing background noise into the synthesized speech to emulate the live agent's environment.

10. The agent assist system according to claim 9, wherein the response to the call contact's voice input comprises providing a second prepared script.

11. The agent assist system according to claim 9 wherein the response to the call contact's voice input comprises connecting the call to the live agent for the live agent to converse with the call contact.

12. The agent assist system according to claim 9, wherein the live agent is free to work on other tasks during the telephone call.

13. A computer program product embedded in a computer readable medium, the computer program product assisting a live agent handling calls, the computer program product comprising:
- a computer readable medium containing computer program code segments comprising
  - a speech synthesis code segment that generates from a proposed script output synthesized speech that sounds like a live agent's natural voice;
  - an initialization code segment that provides the prepared script;
  - a connecting code segment that places a call to a call recipient;
  - a communications code segment that controls transmission to the call contact the synthesized speech generated using the prepared script as input to the speech synthesizer;
  - receiving call contact voice input; and transmitting the call contact voice input to the live agent; and
  - a controller code segment that accepts direction from the live agent indicating a response to the call contact's voice input;
- wherein the communications code segment monitors background noise surrounding the live agent; and the speech synthesizer code segment introduces background noise into the synthesized speech to emulate the live agent's environment.

14. The computer program product embedded in a computer readable medium according to claim 13 wherein the response to the call contact's voice input comprises providing a second prepared script.

15. The computer program product embedded in a computer readable medium according to claim 13 wherein the response to the call contact's voice input comprises connecting the call to the live agent for the live agent to converse with the call contact.

16. The computer program product embedded in a computer readable medium according to claim 13 wherein the live agent is free to work on other tasks during the telephone call.

* * * * *